Patented May 8, 1951

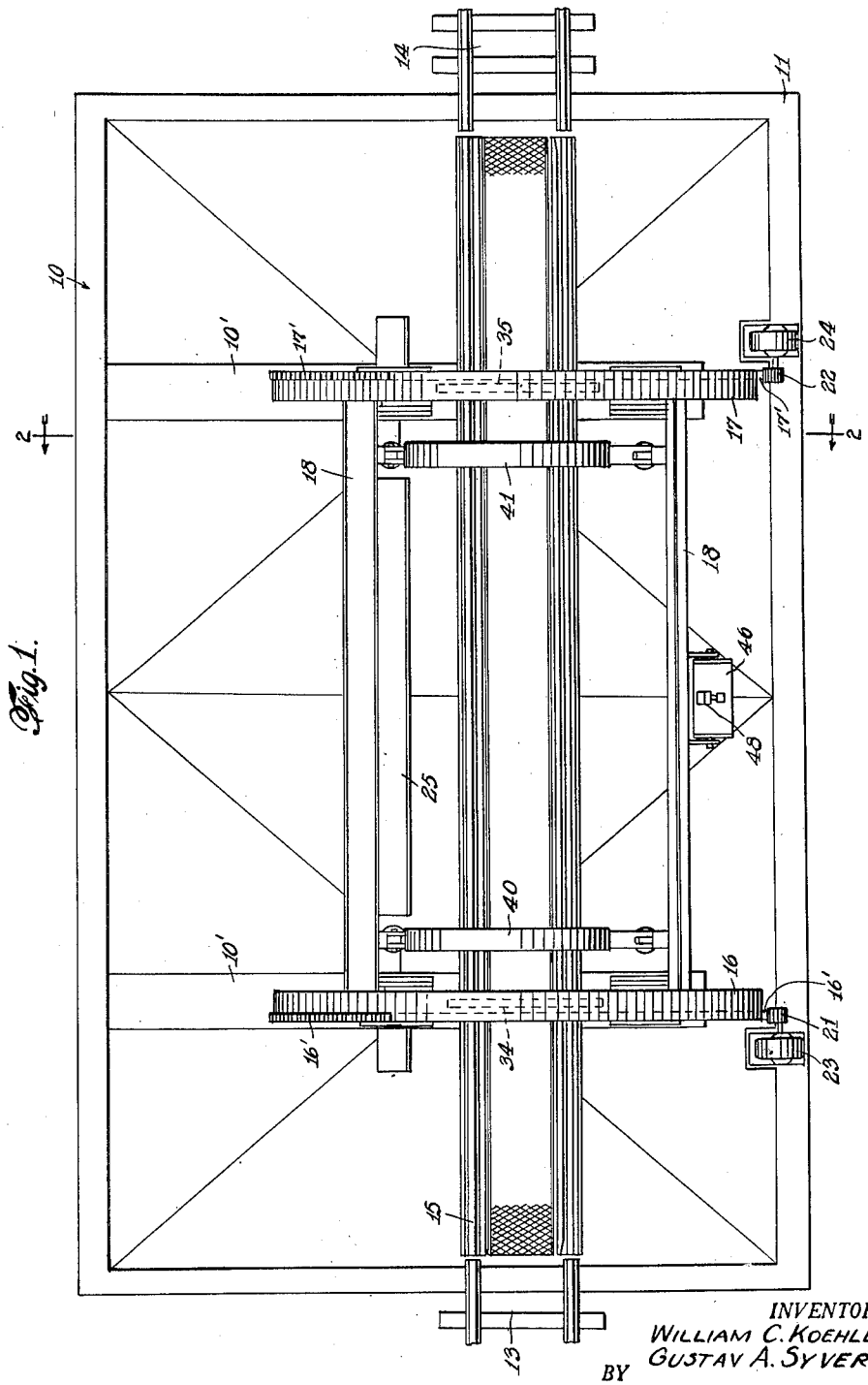

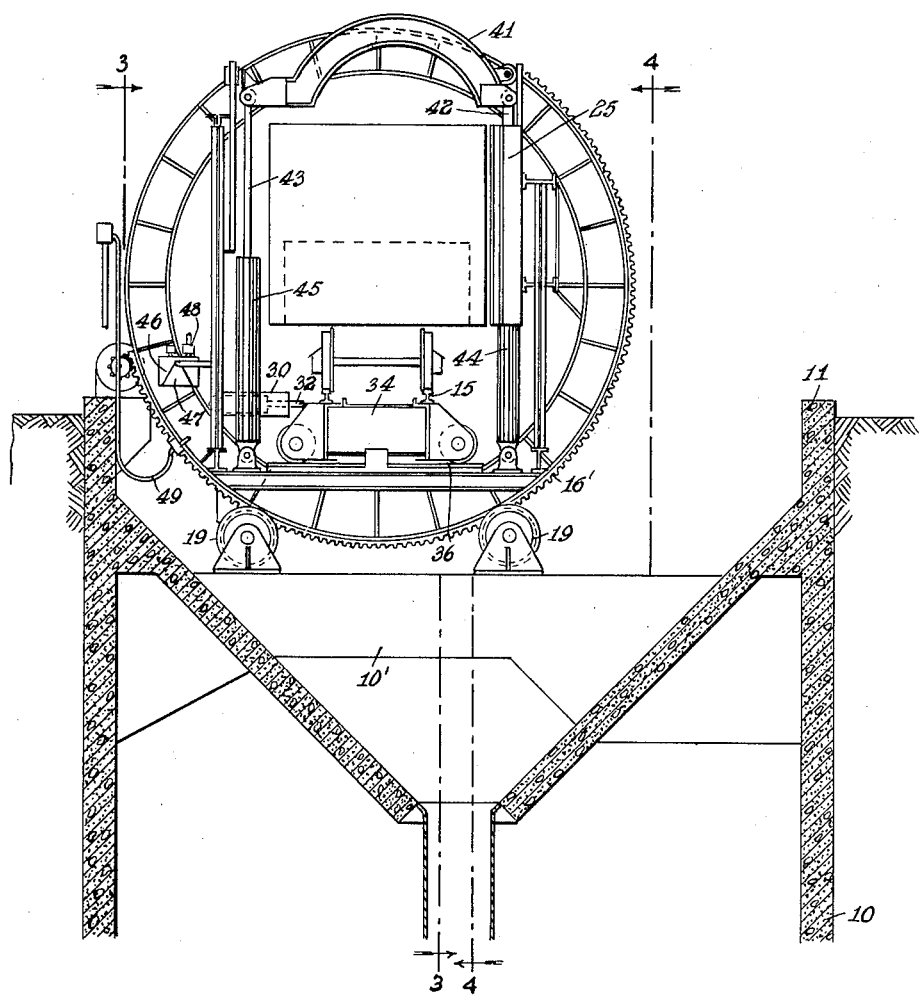

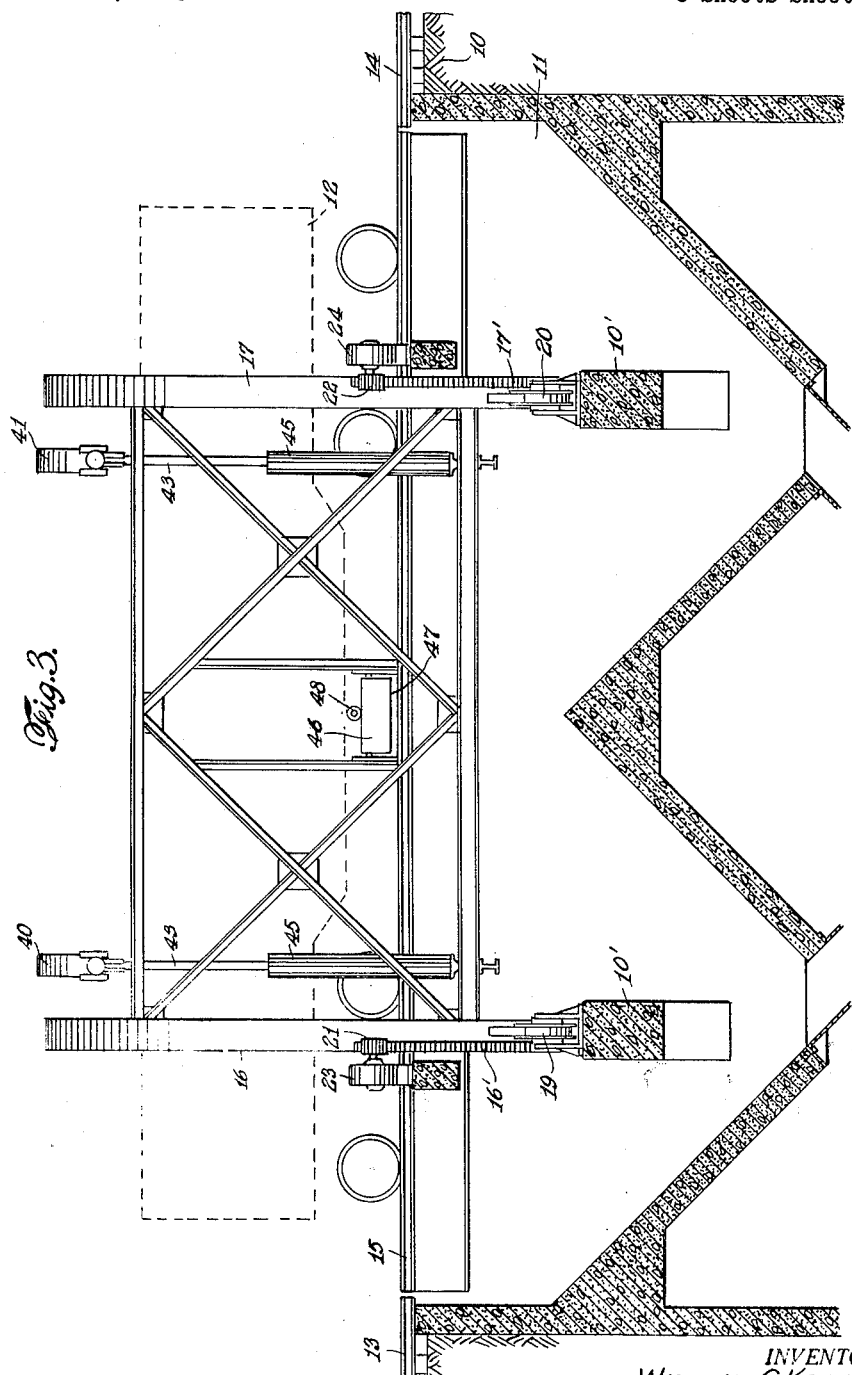

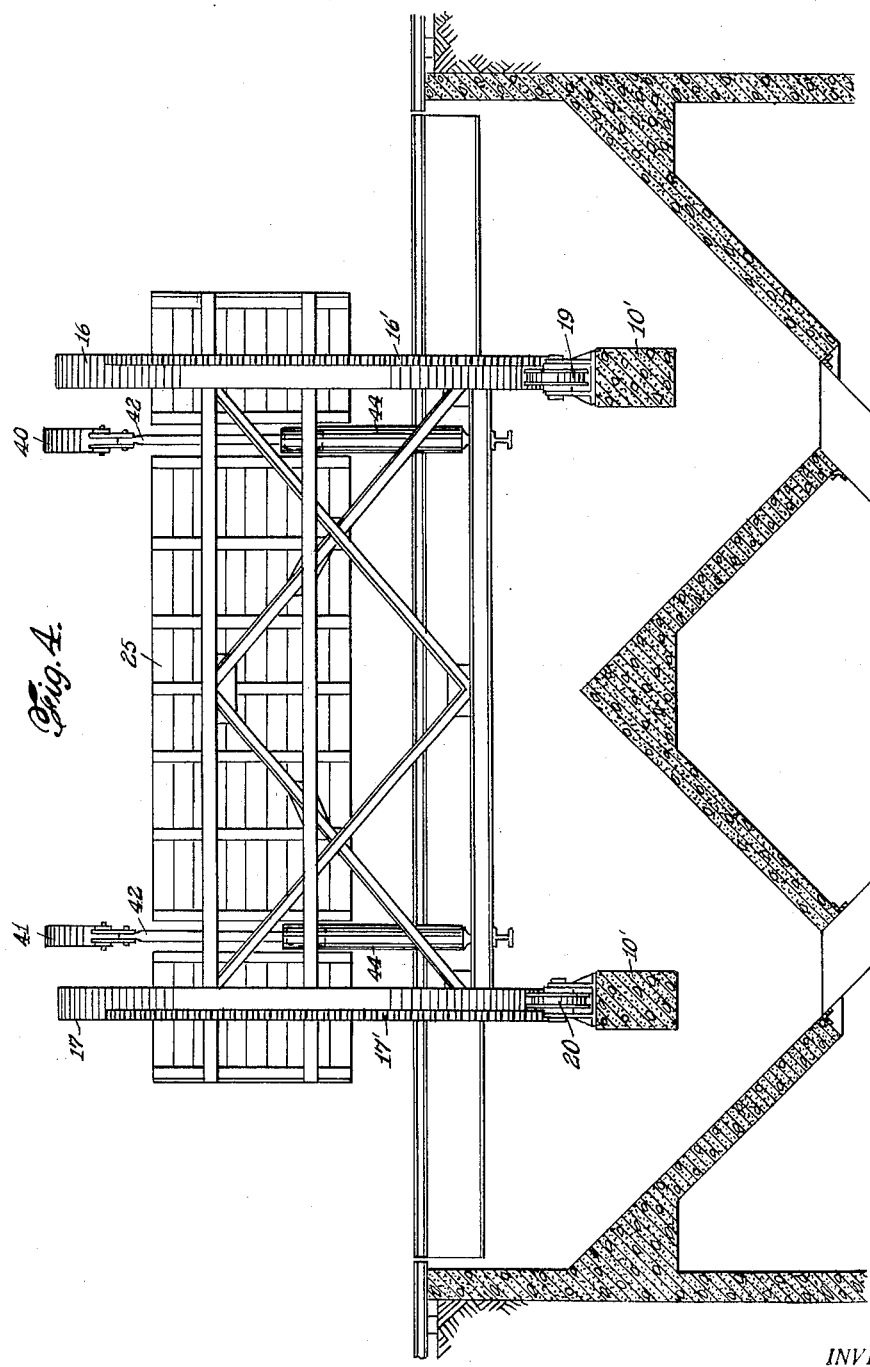

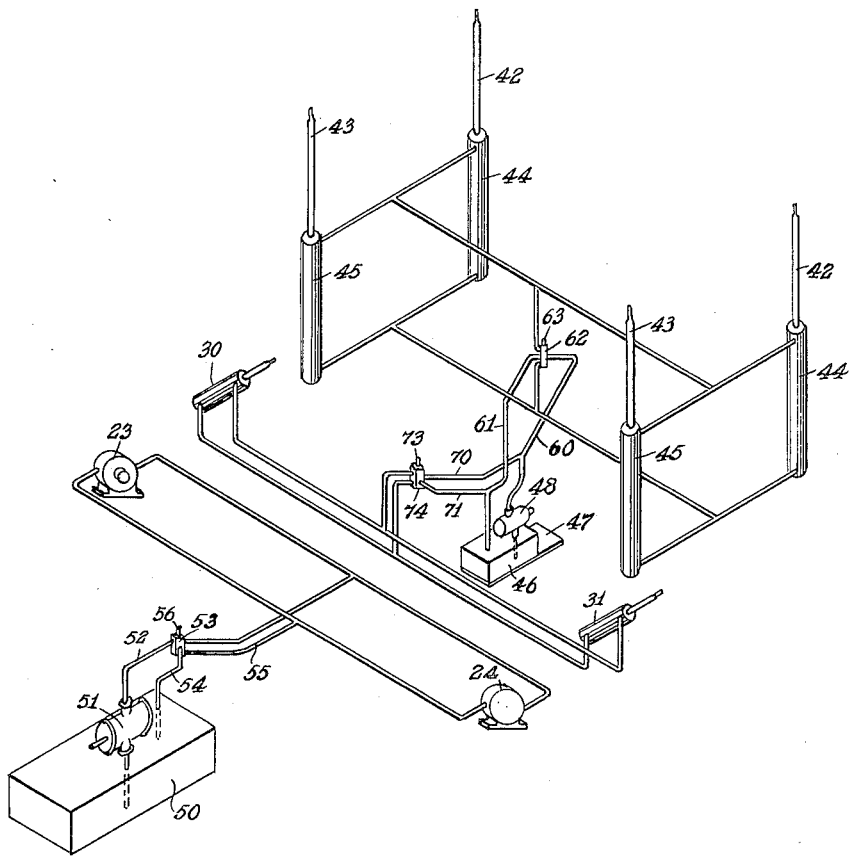

2,552,186

UNITED STATES PATENT OFFICE 2,552,186

CAR DUMPER

William C. Koehler, Belleville, N. J., and Gustav A. Syversen, Brooklyn, N. Y.; said Syversen assignor to said Koehler Application January 22, 1946, Serial No. 642,622

2 Claims. (Cl. 214—55)

The invention relates to car dumping apparatus, more especially as associated with a hopper into which the contents of one or more open-top cars are to be dumped about the longitudinal axis of a car; or, as associated with a supporting foundation from which the dumping is effected.

Apparatus of this nature has heretofore been actuated electrically by suitable motors and controls to effect not only the oscillating movements of a support for the car, but also to control the various holding and locking devices customarily associated with such dumping mechanism. In this connection, it is to be noted that in the conventional methods of oscillating car dumpers embodying a cradle with two or more supporting rings there is one objectionable feature common to all, i. e., unequal driving torques at the rings. This results from manufacturing tolerances, warpages, misalignments, etc., which prevent the application of the driving torque simultaneously to the rings. Thus, when torque is applied thereto, it is first applied on one ring, and after the frame of the apparatus has deformed sufficiently, any addition to the torque required to deform said frame and sufficient to apply torque to the second ring will be divided between the two rings.

However, we have found that in utilizing an hydraulic drive for car dumpers with two or more rings, such deformation may be avoided as two factors cause movement in the fluid motors, namely: pressure and volume of the driving fluid. Since pressure must be equal in all of the driving motors, which are connected to a common source of liquid supply, the pressure factor cannot be different in the two or more driving motors; and the volume is variable in accordance with the power requirements of the various motors. When the revolutions are not exactly equal, the volume of fluid supplied to each motor is proportional to its requirements; and, therefore, no matter how much the rings and equipment may be out of true, the driving torque applied to the various rings will be equal. Furthermore, high starting torque is afforded, and no damage can result in the event that the car dumper mechanism should become overloaded or stalled.

While the particular embodiment of the invention herein described and shown in the drawings is of the rotary type of dumper, it will be appreciated that the invention is applicable to other types of dumpers where an hydraulic drive for oscillating a car is desirable, as well as to effect the displacement of the car and the clamping of said car to its track section.

It is an object of the invention to provide an hydraulic system for effecting oscillation of a car-retaining cradle; also, for the various operations involved in the dumping and in the controls.

A further object of the invention is to provide hydraulic volume and pressure controls for the various operations involved in the dumping of a car.

A still further object of the invention is to provide a suspension system for a fluid supply reservoir and a liquid pump and motor whereby these will be maintained in a level position during rotation of an oscillatable cradle supporting the car to be dumped.

Another object of the invention is to provide hydraulically actuated means for engaging the top of a car to clamp it to the track and whereby the clamping may be accommodated to irregularities in the tops of cars as well as to cars of different heights, and the pressure exerted thereon adjusted to any desired amount.

Still another object of the invention is to provide hydraulically actuated means to displace the car-supporting track laterally, so that the side of the car will engage an abutment wall, and be supported thereon when not in its upright position, and to return the track to its original position.

In carrying out the invention, provision is made for associating with a hopper, or other storage facility or support, a rotatably supported cradle apparatus designed to receive a loaded car, or cars, upon a suitable track section thereof and independent of any fixed trackage over which the car may be run onto the cradle section which is adapted for alignment with said fixed trackage. The said independent track section is displaceably mounted in the cradle, that is to say, laterally toward an abutment wall provided along one side thereof which it is designed to contact. This contact is to be maintained during a portion of the tilting cycle of the car.

Said displacement of the track section, as well as the holding of a car against the side wall, is accomplished by the action of hydraulically operated mechanism; and further hydraulically operated mechanism serves to effect also a clamping action on the top of a car positioned on the said track section. During both of these operations, hydraulic motors have effected rotation of the cradle apparatus but not to a degree to cause the car to tilt unduly before proper holding thereof, as aforesaid, has been accomplished. Continued rotation then of the cradle effects the dumping of the contents of the car. The return to normal involves merely a reverse cycle of operations.

It will be appreciated, also, that where desirable, one or more of the hydraulic operations —other than that of oscillation of the cradle— may be effected instead by the customary mechanical expedients heretofore utilized in apparatus of this type.

The nature of the invention, however, will best be understood when described in connection with the accompanying drawings, in which:

Fig. 1 is a plan view of the novel dumping apparatus and illustrates the same associated with a hopper.

Fig. 2 is a transverse section through the dumping apparatus and a portion of the hopper, taken on the line 2—2, Fig. 1 of the drawings, and looking in the direction of the arrows.

Fig. 3 is a longitudinal section taken on the line 3—3, Fig. 2 of the drawings; and Fig. 4 is a similar view taken on the line 4—4, Fig. 2, and looking in the direction of the arrows in both views.

Fig. 5 is a more or less schematic view, in isometric projection, illustrating the hydraulic connections and apparatus as well as the control means therefor.

Referring to the drawings, 10 designates a fixed support or foundation upon which the novel apparatus is to be erected, for example, with respect to suitable storage facilities as upon a hopper 11 into which the contents of a car may be dumped. In order to locate a car 12, indicated in broken lines, Fig. 3, within the dumping apparatus, suitable trackage as the fixed track portions 13 and 14 extend from the support 10 and opposite ends of the hopper; and these are designed to align with an independent and movable track section 15 of said dumping apparatus.

The track section is supported within an oscillatable cradle member, in the embodiment of the invention shown, constituted of a pair of circular frames 16 and 17 and connecting framing 18. The said circular frames 16 and 17 in turn, are supported on respective rollers 19 and 20 carried on the foundation 10′, and provision is made to rotate individually the said frames. These are, to this end, each provided, for example, with respective circular rack portions 16′ and 17′ engaged by corresponding pinions 21 and 22 to effect a limited oscillation of the cradle sufficient generally to invert completely a car on the track section 15, although the degree of tilt may be varied to suit conditions.

The pinions 21 and 22 are rotated by suitable motors 23 and 24, in the embodiment shown and in accordance with the invention, hydraulically operated motors of any well known or special design and receiving an operating liquid supply, as hereinafter more fully set forth.

The independent track section 15 is so mounted within the cradle as to be displaceable, as a whole and with car 12 positioned thereon, toward a wall or abutment 25 located along one side of the cradle and secured to the connecting framing 18 at the particular side. Such displacement toward the said wall, as well as the return to the normal location of the track section, may be accomplished conveniently and to advantage, also, under hydraulic control. Thus, two hydraulic cylinders 30 and 31 are caused to operate rods 32 and 33, respectively, which are connected, in turn, to corresponding carriages 34 and 35 designed to travel transversely of the track section length over rails 36 mounted on the lower portion of the cradle, the track rails 15 being carried, for example, by the pair of carriages 34 and 35.

In like manner provision is made to actuate one or more clamping elements, as the pair of elements 40 and 41, over the top of a car located within the cradle and upon the track section 15. The clamping elements, which are of the customary design, are pivoted at the opposite ends to respective pairs of piston rods 42 and 43 operated by corresponding pairs of hydraulic cylinders 44 and 45 for reciprocating said rods. No claim is made herein to the particular hydraulic mechanism per se for operating said pairs of rods 42 and 43 as well as for the rods 32 and 33 for displacing the carriages 34 and 35, which mechanism may be of well known or special construction embodying means to admit actuating fluid alternatively to opposite ends of a cylinder as well as to trap fluid within a cylinder whereby to maintain a particular position of its rod, and, also, to apply a cushioning effect thereto.

To secure the required supply of liquid furnished to the various cylinders 30, 31 and 44, 45, provision is made for carrying within the cradle a reservoir 46 as upon a platform or base 47 which is suspended, for example, along one side of the said cradle whereby to maintain the reservoir and other mechanism such as the motor-driven pump 48 substantially level during the tilting of the cradle. A flexible power cable 49 or the like connects from an external source (not shown) to the motor of the pump so as to accommodate the power supply also to the tilting of the said cradle.

The control of the various hydraulic mechanisms hereinbefore described is secured in the following manner to attain the desired sequence of operations, and by means of standard and well known means for which no claim is made. Generally, it will be desirable to initiate the dumping operation by effecting tilting of the cradle first; and before this has progressed sufficiently to cause the carriages 34 and 35 to roll, under the action of gravity, with a car toward the wall 25, the cylinders 30 and 31 go into action to clamp eventually and to hold the car against said wall through the coupled rods 32 and 33. Simultaneously therewith, clamping of the car to its track section is effected by means of the clamping elements 40, 41 so that by the time the car through tilting of the cradle has assumed a considerable angle, provision has thus been made to hold and to maintain the car to its track both laterally and at the top. When the car eventually assumes an inverted position it will be supported solely through the clamping elements. On the return cycle, the sequence is the reverse. All of the operations may, of course, be initiated simultaneously, or, the sequence noted may be varied depending on the particular condition to be met.

In the utilization of hydraulic means for controlling the lateral displacement of the track section with a car toward and away from the wall, a controllable normal acceleration and uniform movement toward said wall becomes possible, thus reducing impact against the same, On the return movement, also, a positive and predetermined force and deceleration effect may be applied to the carriages 34, 35 to relocate precisely the track section with car now freed of its contents and ready for removal from the cradle.

Utilization of hydraulic means in the clamping operation makes necessary only a relatively light clamping pressure sufficient merely to bring the clamping elements into positive contact with the top of the car, after which the liquid in the system becoming trapped a practically unlimited resistance to return movement of said clamping elements is afforded. Also, irregularities in the top of a car are readily accommodated thereby since the individual pistons of the hydraulic cylinders coupled to the clamping elements may travel different distances. In the conventional mechanism locking arrangements, such as pawl and ratchet means, heretofore made use of in this connection discontinuous locking intervals were involved, whereas the novel arrangement provides for a continuous advance to substantially absolute contact.

The supply and control of fluid in the hydraulic operation of the dumping apparatus comprises two independent systems, reference being had to Fig. 5 of the drawings. Power for the first system, which controls the operation of oscillating the cradle, is derived from a source 50 of liquid supply under pressure as afforded by a motor-driven pump 51 delivering to a line 52 in which is interposed a 4-way valve 53 having a return connection 54 to the reservoir 50. From the valve, the liquid under pressure is directed to the two liquid motors 23 and 24 for driving the cradle and having the return connection 55 to said 4-way valve 53. When the valve 53 is operated, as by means of a handle 56 thereof, the motors 23 and 24 are caused to rotate in one direction or in the reverse direction, or to stop, accordingly as the said handle is manipulated—all of which is well understood and forms no part of the present invention.

For the displacing and clamping actions, the mechanisms for which are all located within the cradle and movable therewith, and also operated under much lower pressures, it is preferred to utilize an independent system of pressure fluid supply. This is, preferably, carried also within the cradle. Thus, the reservoir 46 for liquid is mounted on the swingable platform or base 47 and supplies through the motor-driven pump 48 the liquid into a pressure line 60 associated with a return connection 61. In this line is provided a 4-way valve 62 which controls the supply to the two pairs of cylinders 44, 45 for operating the clamping mechanism. The said cylinders are of the conventional type designed to advance and retract the corresponding piston rods 42, 43. By operating valve 62 through its handle 63, pressure liquid may be introduced to either end of the cylinders to correspondingly move the piston rods to respectively clamp or unclamp the car respectively to or from its track section. Another position of the valve will prevent return of the liquid to thereby trap the same in the cylinders, the supply then returning through the return connection 61 to the reservoir. No particular claim to this supply and control arrangement is made so far as the mechanism is concerned, the same being well known in the art.

A pressure supply line 70 is taken as a branch from the supply line 60, and a return line 71 is provided to branch into the return 61. This provides for supply and return of the control liquid to the carriage displacing cylinders 30, 31 through operation of a valve handle 73 of an additional 4-way valve 74 included in the supply-return branches. The action in this instance is similar to that hereinbefore described in connection with the operation of the clamping mechanism.

We claim:

1. The combination with a fixed support provided with trackage; of dumping apparatus mounted on said support and comprising an oscillatable cradle, and a track section supported thereon adapted for alignment with the support trackage for delivery to and discharge from the cradle of the car to be dumped thereby; a plurality of rotary motors and intermediate mechanism to oscillate jointly the cradle therefrom; hydraulically operated means to displace laterally within the cradle its track section; a suspended support carried by the cradle; a reservoir for liquid, a liquid-supply pump and motor to drive said pump, all mounted on said suspended support, said pump being adapted for connection to the means for displacing the track section laterally; and means to clamp a car to said cradle track section.

2. The combination according to claim 1, wherein the means to clamp a car to said track section are hydraulically operated and the pump is also adapted for connection to said means.

WILLIAM C. KOEHLER.
GUSTAV A. SYVERSEN.

REFERENCES CITED

The following references are of record in the file of this patent:

UNITED STATES PATENTS

| Number | Name | Date |
|---|---|---|
| 553,122 | Long | Jan. 14, 1896 |
| 758,191 | Robertson | Apr. 26, 1904 |
| 1,157,415 | Norton | Oct. 19, 1915 |
| 1,299,527 | Wood | Apr. 8, 1919 |
| 1,508,997 | Simpson et al. | Sept. 16, 1924 |
| 1,572,654 | Kaltenbach | Feb. 9, 1926 |
| 1,735,022 | Strauss | Nov. 12, 1929 |
| 1,787,812 | Brown | Jan. 6, 1931 |
| 2,060,220 | Kennedy | Nov. 10, 1936 |

FOREIGN PATENTS

| Number | Country | Date |
|---|---|---|
| 3,317 | Great Britain | Feb. 8, 1913 |
| 519,086 | Great Britain | Mar. 15, 1940 |